US011220921B2

United States Patent
Harding

(10) Patent No.: US 11,220,921 B2
(45) Date of Patent: Jan. 11, 2022

(54) VANE ASSEMBLY

(71) Applicant: ROLLS-ROYCE plc, London (GB)

(72) Inventor: Adrian L. Harding, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/061,815

(22) Filed: Oct. 2, 2020

(65) Prior Publication Data

US 2021/0123353 A1    Apr. 29, 2021

(30) Foreign Application Priority Data

Oct. 24, 2019 (GB) .................................. 1915418

(51) Int. Cl.
*F01D 9/04* (2006.01)
*F01D 25/12* (2006.01)

(52) U.S. Cl.
CPC ............ *F01D 9/041* (2013.01); *F01D 9/042* (2013.01); *F01D 9/044* (2013.01); *F01D 25/12* (2013.01); *F05D 2220/32* (2013.01); *F05D 2240/12* (2013.01); *F05D 2260/20* (2013.01); *F05D 2300/20* (2013.01)

(58) Field of Classification Search
CPC .......... F01D 9/041; F01D 9/044; F01D 9/042; F01D 25/12; F01D 5/188; F01D 5/284; F01D 5/147
See application file for complete search history.

(56) References Cited

U.S. PATENT DOCUMENTS

| 4,563,128 A  * | 1/1986 | Rossmann ............... F01D 5/284 416/92 |
| 7,452,182 B2 * | 11/2008 | Vance ...................... F01D 5/14 415/135 |
| 7,963,745 B1 * | 6/2011 | Liang ...................... F01D 5/284 416/97 R |
| 8,197,211 B1 * | 6/2012 | Liang ...................... F01D 5/282 416/97 R |
| 9,828,914 B2 * | 11/2017 | Suciu ...................... F01D 25/12 |
| 10,060,272 B2 * | 8/2018 | Jennings ................. F01D 5/282 |

(Continued)

FOREIGN PATENT DOCUMENTS

CN          108661945 A          10/2018

OTHER PUBLICATIONS

Great Britain search report dated Feb. 25, 2020, issued in GB Patent Application No. 1915418.6.

(Continued)

*Primary Examiner* — Michael Lebentritt
*Assistant Examiner* — Brian Christopher Delrue

(57) ABSTRACT

A vane assembly includes an aerofoil having a leading edge, a trailing edge, and a pressure surface and a suction surface defined between the leading edge and the trailing edge. The aerofoil includes a blade member forming the trailing edge, at least a portion of the pressure surface and at least a portion of the suction surface. The blade member is formed of a first material. The aerofoil further includes a spar at least partly enclosed by the blade member and forming at least a portion of the leading edge. The spar further forms at least one cooling channel and supports at least a portion of an interior surface of the blade member. The spar is formed of a second material different from the first material. The second material has a greater impact resistance than the first material.

14 Claims, 10 Drawing Sheets

(56) References Cited

U.S. PATENT DOCUMENTS

| | | |
|---|---|---|
| 2010/0266415 A1 | 10/2010 | Viens et al. |
| 2016/0222806 A1 | 8/2016 | Jennings |
| 2017/0254207 A1* | 9/2017 | Schetzel ................. F01D 5/147 |
| 2018/0073519 A1* | 3/2018 | Welch ..................... F01D 5/147 |

OTHER PUBLICATIONS

European search report dated Mar. 15, 2021, issued in EP Patent Application No. 20201248.

\* cited by examiner

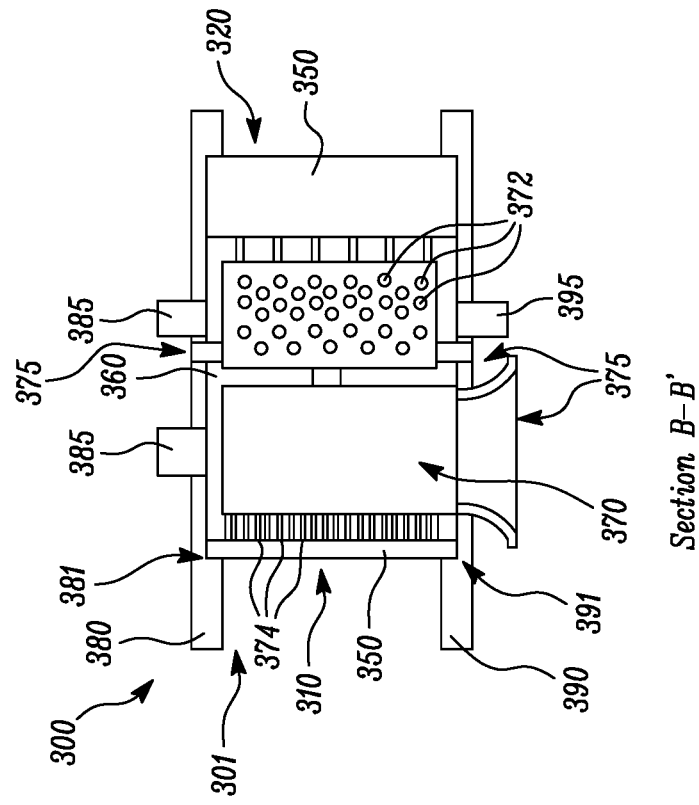
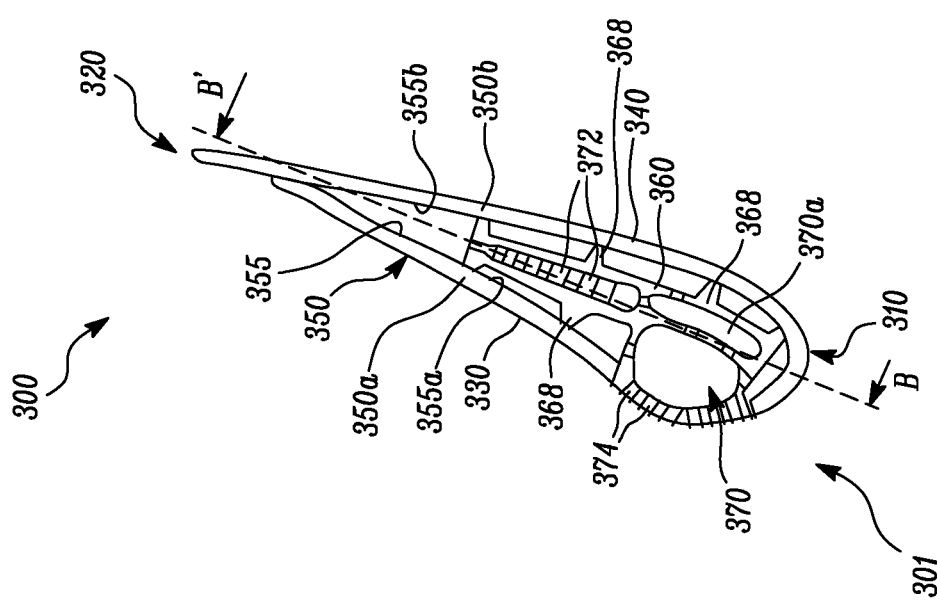
FIG. 5b
FIG. 5a

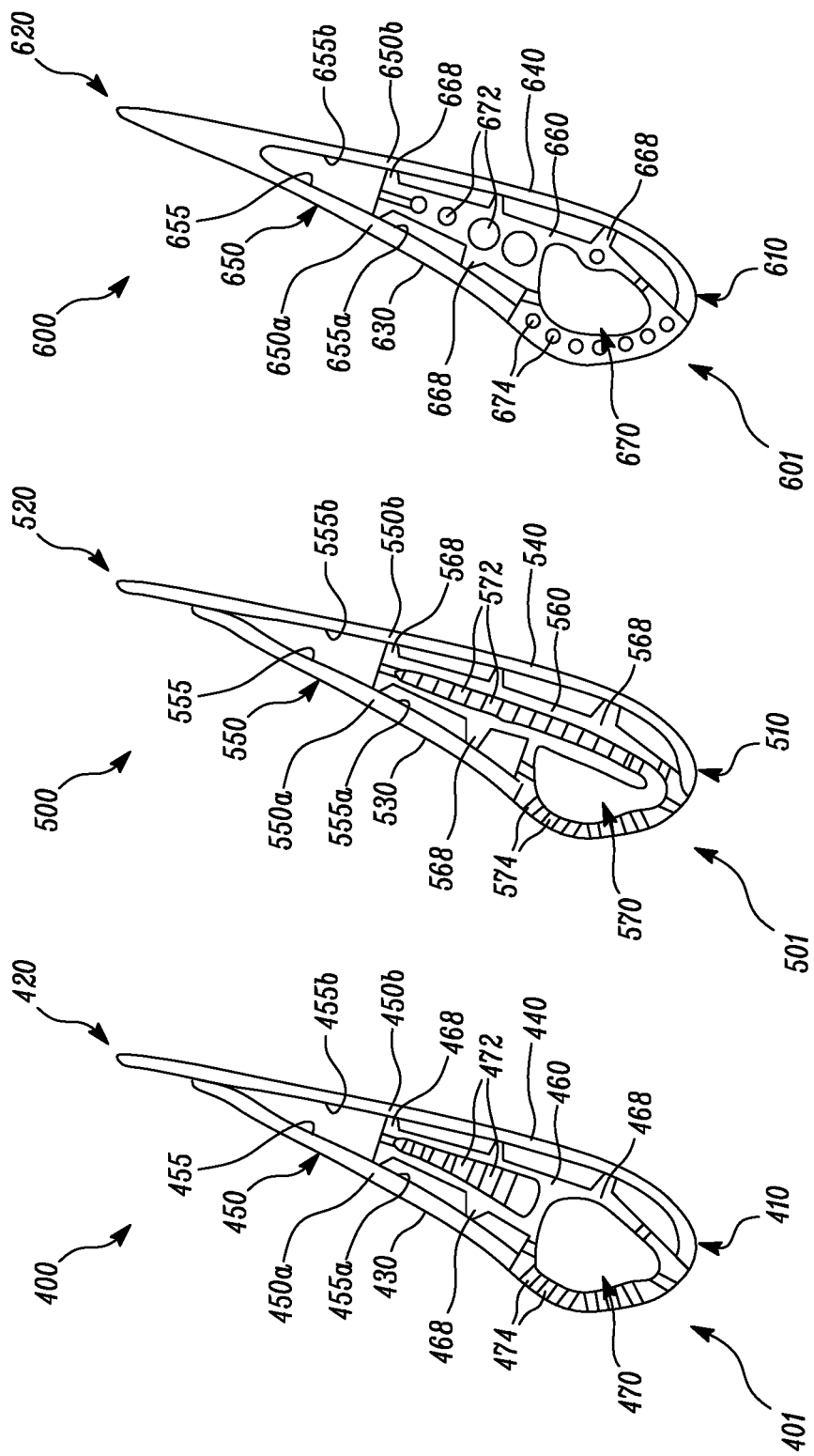

VANE ASSEMBLY

CROSS-REFERENCE TO RELATED APPLICATIONS

This specification is based upon and claims the benefit of priority from UK Patent Application Number 1915418.6 filed on 24 Oct. 2019, the entire contents of which is incorporated herein in its entirety by reference.

BACKGROUND

Technical Field

The present disclosure relates to a vane assembly, and in particular a vane assembly for a gas turbine engine.

Description of the Related Art

A vane assembly for a gas turbine engine typically includes an aerofoil, such as a stator vane to power an aircraft. The performance of gas turbine engines, whether measured in terms of efficiency or specific output, is improved by increasing the turbine gas temperature. Therefore, it is desirable to operate the turbines at the highest possible temperatures. However as turbine entry temperatures increase, the lifespan of an un-cooled turbine falls, necessitating the development of better materials and the introduction of internal cooling. In some cases, gas temperatures in a high pressure turbine are hotter than the melting point of the material of turbine aerofoils. Fully metallic aerofoils use large amounts of cooling fluid to sustain the high temperature environment. On the other hand, ceramic matrix composite (CMC) aerofoils use less cooling fluid. However, CMC aerofoils have low strength, therefore they require an internal spar to transmit gas loads to platforms. Further, CMC leading edge designs are prone to foreign object damage (FOD) damage.

SUMMARY

According to a first aspect there is provided a vane assembly including an aerofoil having a leading edge, a trailing edge, and a pressure surface and a suction surface defined between the leading edge and the trailing edge. The aerofoil includes a blade member forming the trailing edge, at least a portion of the pressure surface and at least a portion of the suction surface. The blade member is formed of a first material. The aerofoil further includes a spar at least partly enclosed by the blade member and forming at least a portion of the leading edge. The spar further forms at least one cooling channel and supports at least a portion of an interior surface of the blade member. The spar is formed of a second material different from the first material. Further, the second material has a greater impact resistance than the first material.

The first material may reduce a total cooling requirement of the blade member whilst avoiding high thermal stresses as well as allowing operation of a gas turbine engine at higher temperatures. Further, the blade member formed of the first material may not require film cooling and therefore reduce the total cooling requirement as well as reducing a manufacturing complexity.

Further, the second material may provide the spar with a desired impact resistance or mechanical strength.

Integrating at least a portion of the leading edge and the spar may effectively create a larger spar, with an increased load capability. The spar may be manufactured using additive layer manufacturing (ALM). Further, ALM may enable further cooling improvements and/or providing design scope for weight and cost reduction of the vane assembly.

In some embodiments, the blade member further includes a first section forming at least the portion of the pressure surface and a second section forming at least the portion of the suction surface. The first section and the second section together form the trailing edge. The spar supports at least a portion of an interior surface of the first section and at least a portion of an interior surface of the second section.

The first and second sections may be devoid of any cooling features due to low cooling requirements. This may simplify manufacturing of the first and second sections.

In some embodiments, the spar and the first section together form the leading edge.

In some embodiments, the spar and the first section together form the pressure surface.

In some embodiments, the second section forms entirely the suction surface.

In some embodiments, the first section and the second section are separate parts.

In some embodiments, the first section and the section are integrally formed.

In some embodiments, the vane assembly further includes a fastener coupling the spar to at least one of the first section and the second section. In some embodiments, the fastener is a solid rivet or a hollow rivet.

In some embodiments, the vane assembly further includes a first platform disposed proximate a top end of the aerofoil and a second platform disposed proximate a bottom end of the aerofoil. The spar further includes at least one first locating feature coupling the spar to the first platform, at least one second locating feature coupling the spar to the second platform, and at least one support feature supporting the spar on the second platform.

In some embodiments, the first material includes a ceramic matrix composite (CMC). The CMC may reduce the cooling requirements of the blade member, thereby yielding a high cooling effectiveness and reducing a cooling fluid requirement.

In some embodiments, the second material includes a metallic material. The metallic material may provide the spar with a greater impact resistance and a good combination of strength and durability.

In some embodiments, the vane assembly further includes at least one inlet for supplying cooling fluid to the at least one cooling channel of the spar.

In some embodiments, the blade member is joined to the spar by at least one of welding, brazing and bi-casting.

According to a second aspect there is provided a gas turbine engine including the vane assembly of the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear.

The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being Jkg$^{-1}$K$^{-1}$/(ms$^{-1}$)$^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 4b is a schematic sectional side view of the vane assembly taken along a line A-A' in FIG. 4a;

FIG. 5a is a schematic sectional view of an aerofoil of another embodiment of a vane assembly;

FIG. 5b is a schematic sectional side view of the vane assembly taken along a line B-B' in FIG. 5a;

FIG. 6 is a schematic sectional view of an aerofoil of another embodiment of a vane assembly;

FIG. 7 is a schematic sectional view of an aerofoil of another embodiment of a vane assembly;

FIG. 8 is a schematic sectional view of an aerofoil of another embodiment of a vane assembly;

DETAILED DESCRIPTION

Aspects and embodiments of the present disclosure will now be discussed with reference to the accompanying figures. Further aspects and embodiments will be apparent to those skilled in the art.

Figure 1:
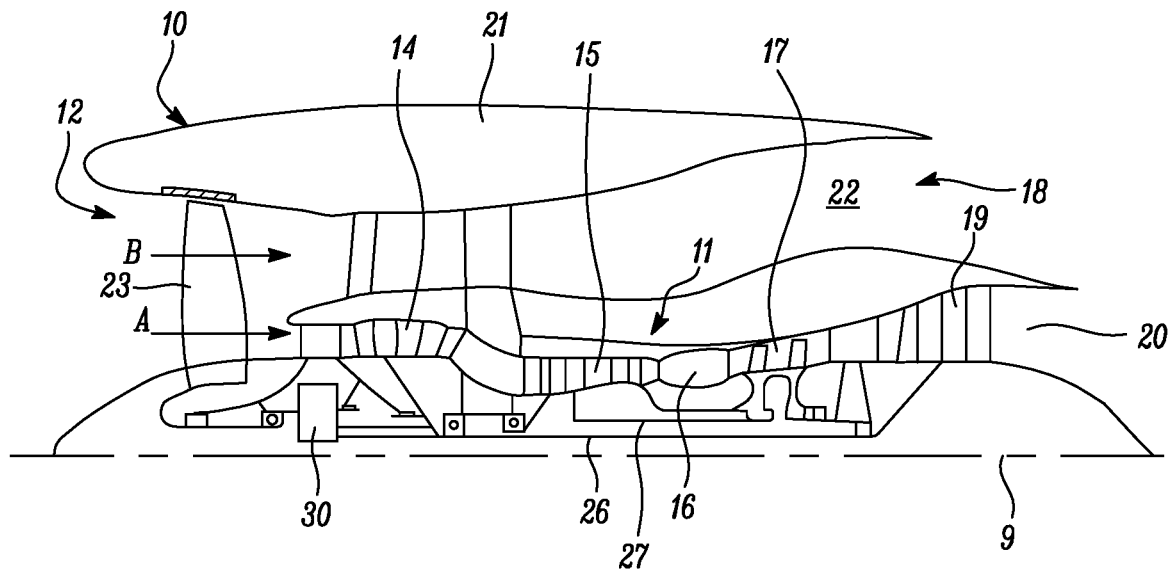
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
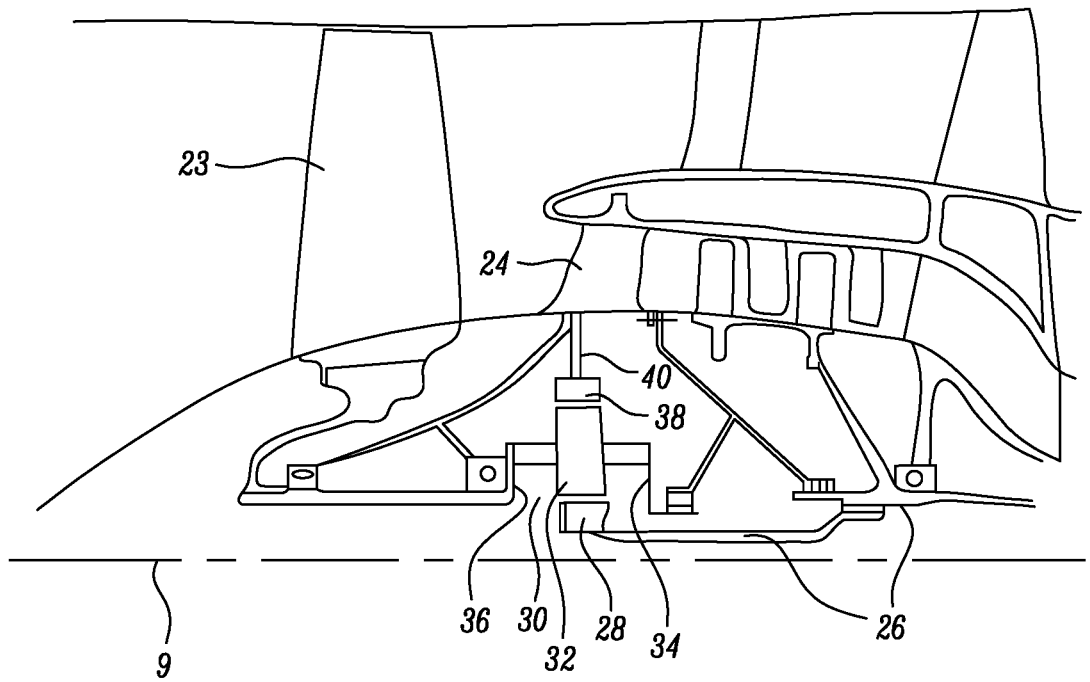
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
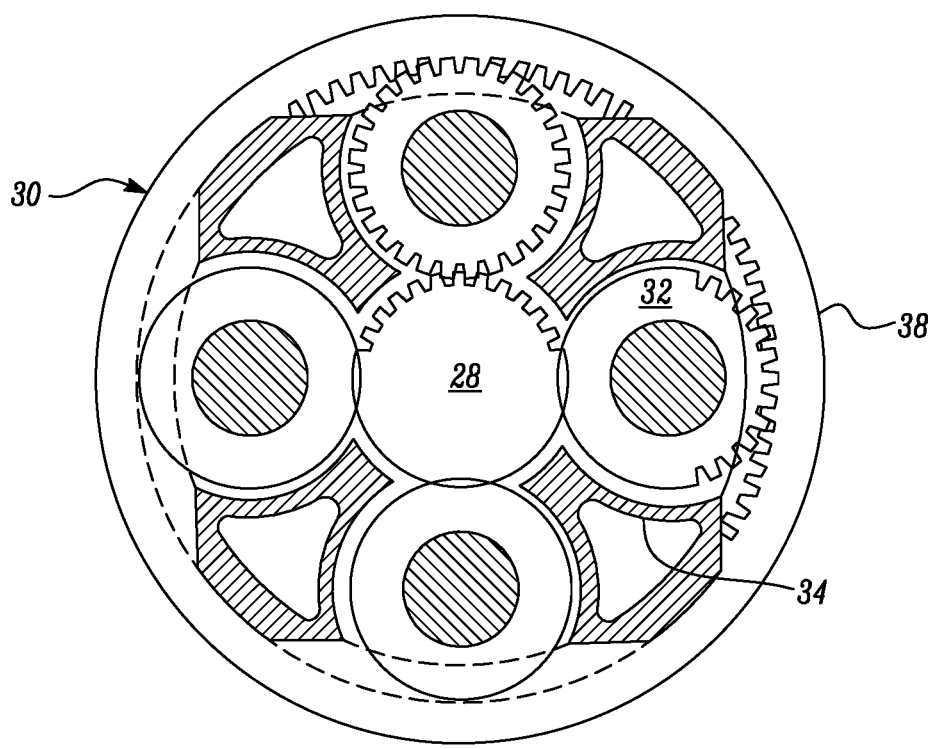
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines and land-based gas turbine engines.

Figure 4B:
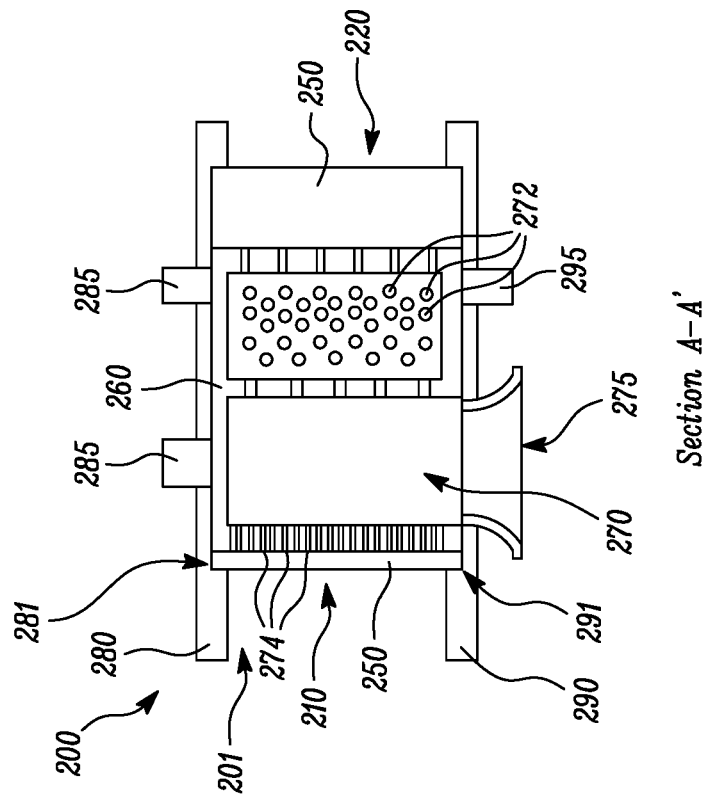
Figure 4A:
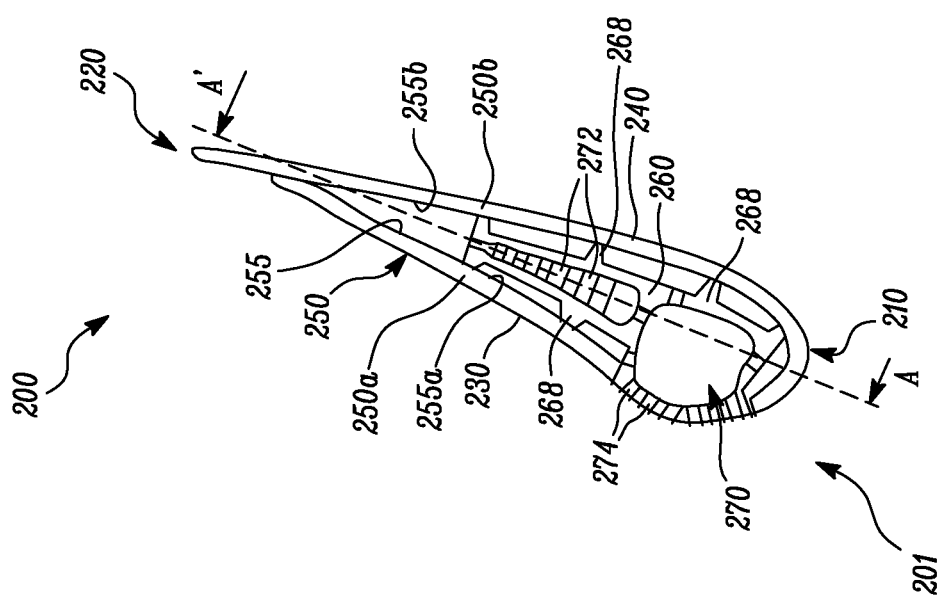
FIG. 4a is a schematic sectional view of an aerofoil of a vane assembly.

FIG. 4a illustrates a vane assembly 200 for use with the engine 100 to power an aircraft (not shown), in accordance with an embodiment of the present disclosure. The vane assembly 200 includes an aerofoil 201, such as a stator vane. In some embodiments, the stator vanes are nozzle guide vanes (NGVs). In some embodiments, the aerofoil 201 is a stator vane for use in a turbine (e.g., the high pressure turbine 17) of the engine 100. In some embodiments, the stator vane may be configured for use in a compressor of the engine 100.

The aerofoil 201 has a leading edge 210 and a trailing edge 220. The aerofoil 201 includes a pressure surface 230 and a suction surface 240 defined between the leading edge 210 and the trailing edge 220. The pressure surface 230 may be substantially concave, while the suction surface 240 may be substantially convex. The aerofoil 201 further includes a blade member 250 and a spar 260.

The blade member 250 forms the trailing edge 220, at least a portion of the pressure surface 230 and at least a portion of the suction surface 240. The blade member 250 is formed of a first material. In some embodiments, the first material may be a non-metallic, low-strength material. In some embodiments, the first material may include any suitable material that has a higher degree of thermal conductivity. In some embodiments, the first material may include a ceramic-based material. The ceramic-based material may include, but is not limited to, oxides, carbides, nitrides, borides, silicides, and combinations thereof. In some embodiments, the first material includes a ceramic matrix composite (CMC). A CMC has a reinforcement phase, such as ceramic or carbon fibres, dispersed in a ceramic matrix formed of oxides, carbides, nitrides, borides, silicides, or combinations thereof. In some embodiments, the cmC material may be anisotropic, at least in the sense that it can have different strength characteristics in different directions. It is appreciated that various factors, including material selection and fibre orientation, can affect the strength characteristics of a cmC material. In addition, the cmC material may comprise oxide as well as non-oxide CMC materials. In an embodiment, the cmC material may comprise alumina, and the fibres may comprise an aluminosilicate composition consisting of approximately 70% alumina; 28% silica; and 2% boron (sold under the name NEXTEL™312). The fibres may be provided in various forms, such as a woven fabric, blankets, unidirectional tapes, and mats.

In some embodiments, the NGV stator vanes are immediately downstream of a combustion equipment. The NGV stator vanes therefore require significant cooling. Internal convection and film cooling are the primary methods of cooling the gas path components, such as aerofoils, platforms, shrouds etc. NGVs may consume the greatest amount of cooling fluid on high temperature engines. High pressure turbine blades typically use about half of the NGV coolant flow. Intermediate pressure and low pressure turbines downstream of the high pressure turbine may use progressively less cooling fluid because combustion gases become progressively cooler. The first material reduces a total cooling requirement of the blade member 250 of the vane assembly 200 whilst avoiding high thermal stresses as well as allowing operation of the gas turbine engine 100 at higher temperatures. Further, the blade member 250 formed of the first material may not require film cooling and therefore reduce the total cooling requirement as well as reducing a manufacturing complexity. If enhanced thermal or environmental resistance is desired, the blade member 250 can be coated with a thermal and/or environmental barrier ceramic coating, including, but not limited to, segmented coatings. The thermal and/or environmental barrier ceramic coating may provide environmental protection and reduce heat transfer to the turbine. In some embodiments, further coatings, e.g., bond coatings, may also be included on the blade member 250.

The spar 260 is at least partly enclosed by the blade member 250 and forms at least a portion of the leading edge 210. The spar 260 locates and supports the blade member 250 and transmits the aerodynamic loads to first and second platforms 280, 290 (shown in FIG. 4b). Integrating at least a portion of the leading edge 210 and the spar 260 effectively creates a larger spar, with an increased load capability. In some embodiments, the spar 260 may be manufactured using additive layer manufacturing (ALM). Further, ALM may enable further cooling improvements and/or providing design scope for weight and cost reduction of the vane assembly 200. The spar 260 forms at least one cooling channel 270 and supports at least a portion of an interior surface 255 of the blade member 250. The spar 260 may extend from a root to a tip (not shown) of the vane assembly 200, defining the at least one cooling channel 270. In some embodiments, a cooling fluid enters the at least one cooling channel 270 via the root and flows towards the tip. In some other embodiments, the cooling fluid may be fed via the tip. The cooling fluid enters the spar 260 and travels through the spar 260 to cool the leading edge 210 and, then passes along the pressure surface 230 and the suction surface 240, and the trailing edge 220. In some embodiments, the spar 260 may further include internal cooling features 272 through which the cooling fluid flows and strikes the interior surface 255 of the blade member 250. The at least one cooling channel 270 is in fluid connection with the internal cooling features 272. The internal cooling features 272 are provided downstream of the cooling channel 270. In some embodiments, the internal cooling features 272 may also be present in walls of the spar 260. The spar 260 further defines multiple rows of cooling holes 274 extending from the cooling channel 270 to the leading edge 210 and the pressure surface 230. In some embodiments, the rows of cooling holes 274 may provide film cooling to the leading edge 210. The cooling channel 270 may be the main cooling channel or cavity of the spar 260 that receives the cooling fluid. The shape and the size of the cooling channel 270 may vary as per the cooling requirements. The shape, size and number of the rows of cooling holes 274 and the internal cooling features 272, as shown in FIG. 4a, are exemplary in nature and can vary based on the cooling requirements.

The spar 260 is formed of a second material different from the first material. The second material may provide the spar 260 with a desired impact resistance or mechanical strength. The spar 260 may be manufactured by various methods, such as casting or additive manufacturing, and may include one or more materials. In some embodiments, the second material includes a metallic material. In some embodiments, the second material may include an alloy or superalloy materials. Superalloy materials may be highly corrosion-resistant and oxidation-resistant alloys that exhibit excellent mechanical strength and resistance at even high temperatures. Metal alloys provide a good combination of strength and durability. Example alloys may include, but are not limited to, nickel alloys, cobalt alloys, a nickel alloy coated with cobalt or cobalt alloy, or non-nickel alloys. The second material of the spar 260 has a greater impact resistance than the first material of the blade member 250. In some cases, the spar 260 may be made of two or more different materials. In some embodiments, the spar 260 may include a coating or cobalt-based material at one or more interfaces with the blade member 250.

The blade member 250 includes a first section 250a and a second section 250b. In the illustrated embodiment of FIG. 4a, the first section 250a and the second section 250b are separate parts. In some embodiments, the first section 250a and the second section 250b may be separate or joined at one or more locations, for example at the tip, the root, or the trailing edge 220 of the aerofoil 201. The first section 250a forms at least the portion of the pressure surface 230. The spar 260 and the first section 250a together form the pressure surface 230. In some embodiments, the first section 250a forms about 80% of the pressure surface 230. The spar 260 may form the remaining about 20% of the pressure surface 230. The second section 250b forms at least the portion of the suction surface 240. In the illustrated embodiment of FIG. 4a, the second section 250b forms about 90% the suction surface 240. The first section 250a and the second section 250b together form the trailing edge 220. The spar 260 supports at least a portion of an interior surface 255a of the first section 250a and at least a portion of an interior surface 255b of the second section 250b. The blade member 250 is joined to the spar 260 by at least one of welding, brazing and bi-casting. In some embodiments, the blade member 250 may be integral with the first and second platforms 280, 290 (shown in FIG. 4b).

In some other embodiments, the first section 250a forms at least 40%, at least 50%, at least 60%, or at least 70% of the pressure surface 230, and the spar 260 forms less than 50%, less than 40%, less than 30%, less than 20% or less than 10% of the pressure surface 230. In some other embodiments, the second section 250b forms at least 80%, at least 85%, at least 90%, or at least 95% of the suction surface 240. The spar 260 forms at least 20%, at least 15%, at least 10%, or at least 5% of the suction surface 240. In some other embodiments, the spar 260 and the first section 250a together form the leading edge 210. In some other embodiments, the spar 260, the first section 250a, and the second section 250b together form the leading edge 210. In some embodiments, the spar 260 forms at least 20%, at least 30%, at least 40%, at least 50%, at least 60%, at least 70%, or at least 80% of the leading edge 210. In some embodiments, the second section 250b forms at least 20%, at least 30%, at least 40%, at least 50%, at least 60%, at least 70%, or at least 80% of the leading edge 210. In some other embodiments, the spar 260 may entirely form the leading edge 210. The spar 260 may taper in a region between the first and second sections 250a, 250b.

The spar 260 includes multiple projections 268 that interface with and support the first and second sections 250a, 250b at the respective interior surfaces 255a, 255b. The multiple projections 268 may therefore form multiple interface zones with the blade member 250. In some embodiments, each projection 268 may include a coating at the interface with the first or second sections 250a, 250b. The coating may reduce abrasion and/or corrosion of the projections 268. The coating may include cobalt, titanium, graphite or combinations thereof.

In some embodiments, the vane assembly 200 may further include a fastener for coupling the spar 260 to at least one of the first section 250a and the second section 250b. In some embodiments, the fastener may pass through the spar 260 and the aerofoil 201. In some other embodiments, the fastener passes through the spar 260 and at least one of the first section 250a and the second section 250b. In some embodiments, ends of the fastener may be secured by threaded engagement or can extend through and secured using a retainer, such as a nut or other fastener. In some embodiments, the fastener may be a solid rivet (shown in FIG. 10a) or a hollow rivet (shown in FIG. 10b). In some other embodiments, the spar 260 may be coupled to at least one of the first section 250a and the second section 250b by any suitable method, such as, hooks, clips, and so forth.

FIG. 4b illustrates a sectional side view of the vane assembly 200 taken along a line A-A' in FIG. 4a. FIG. 4b illustrates the vane assembly 200 further including the first platform 280 and the second platform 290. The first platform 280 is disposed proximate a top end 281 of the aerofoil 201. Specifically, the first platform 280 is disposed proximate the tip of the aerofoil 201. The second platform 290 is disposed proximate a bottom end 291 of the aerofoil 201. The aerofoil 201 may extend between the first and second platforms 280, 290. The spar 260 may transmit the aerodynamic loads to the first and second platforms 280, 290. In some embodiments, the first and second platforms 280, 290 may further include cooling fluid passages extending therethrough in communication with a cooling fluid source. The spar 260 includes at least one first locating feature 285 coupling the spar 260 to the first platform 280, and at least one second locating feature 295 coupling the spar 260 to the second platform 290. In the illustrated embodiment, the spar 260 includes two first locating features 285 coupling the spar 260 to the first platform 280 and one second locating feature 295 coupling the spar 260 to the second platform 290. In some embodiments, the spar 260 includes at least one support feature 705a (shown in FIG. 9b) supporting the spar 260 on the second platform 290. In some embodiments, the spar 260 further includes at least one support feature 705b (shown in FIG. 9b) supporting the spar 260 on the first platform 280. In some embodiments, the at least one support feature 705a and/or the at least one support feature 705b support the first and second sections 250a, 250b at the trailing edge 220.

The vane assembly 200 further includes at least one inlet 275 for supplying the cooling fluid to the at least one cooling channel 270 of the spar 260. The at least one inlet 275 may extend between the at least one cooling channel 270 and the cooling fluid passages in at least one of the first and second platforms 280, 290. The at least one inlet 275, as shown in FIG. 4b, is exemplary in nature and can have alternative shapes or configurations. In some other embodiments, the at least one inlet 275 may be a hole in the at least one of the first and second platforms 280, 290. In some embodiments, the cooling fluid for the leading edge 210 and the spar 260 may be wholly or in part supplied from first and second platforms cooling cavities (not shown) in order to minimise the cooling fluid consumption. In some embodiments, the cooling fluid includes high pressure air from one of the compressors, typically the high pressure compressor 15 (shown in FIG. 1), that has by-passed the combustion equipment 16 (shown in FIG. 1) and is therefore relatively cool compared to the combustion or working gas temperature. Typical cooling fluid temperatures from the compressor are between 527° C. (800K) and 727° C. (1000K), while gas temperatures can be in excess of 1827° C. (2100K).

The cooling fluid is used to cool the leading edge 210 and the spar 260 and then provide cooling to the blade member 250. In this embodiment, the cooling fluid is supplied to the spar 260 by the inlet 275 to the cooling channel 270 of the spar 260. The cooling fluid enters the cooling channel 270 of the spar 260 and travels through the leading edge 210 and the spar 260 to cool the leading edge 210 and the spar 260, before passing through the first section 250a and the second section 250b to cool the pressure surface 230 and the suction surface 240, and the trailing edge 220. The cooling channel 270 of the spar 260 may use any cooling technique, for example, single or multi-pass, cascade impingement, and so forth. In some embodiments, the leading edge 210 may not require film cooling.

In some embodiments, all cooling features of the aerofoil 201, such as channels, internal cooling features, rows of cooling holes, etc., are formed in the spar 260. The first and second sections 250a, 250b may be devoid of any cooling features due to low cooling requirements. This may simplify manufacturing of the first and second sections 250a, 250b.

The aerofoil 201 and the first and second platforms 280, 290 may be formed separately and then assembled by various methods, such as by brazing, hooks, clips, fasteners, rivets, and so forth. The aerofoil 201 and surfaces of the first and second platforms 280, 290 are subjected to the hot combustion gases from the combustion equipment 16 (shown in FIG. 1). Compressor bleed air is supplied to the aerofoil 201 and the first and second platforms 280, 290 to provide cooling, such as with impingement cooling techniques. In some embodiments, the cooling channel 270 of the spar 260 may be used to route the cooling fluid through the aerofoil 201 to provide cooling to the first and second platforms 280, 290. A thermal barrier coating (TBC) is typically applied to the surfaces of the first and second platforms 280, 290 exposed to the hot combustion gases to provide environmental protection and reduce heat transfer to the turbines 17, 19 (shown in FIG. 1). In some embodiments, further coatings, e.g., bond coatings, may also be included on the surfaces of the first and second platforms 280, 290. The first and second platforms 280, 290 may be formed from various materials such as a single-crystal nickel, cobalt, or iron-based superalloy of a type suitable for use in gas turbine engines.

FIGS. 5a and 5b illustrate a vane assembly 300 in accordance with another embodiment of the present disclosure. The vane assembly 300 is similar to the vane assembly 200 of FIGS. 4a and 4b, with each of features 301 to 395 corresponding to equivalent features 201 to 295 of the vane assembly 200. However, the spar 360 includes a different arrangement of the cooling features for allowing the cooling fluid to flow therethrough. Specifically, the spar 360 includes an additional cooling channel 370a for allowing a different flow of the cooling fluid. Moreover, the vane assembly 300 further includes multiple inlets 375 for supplying the cooling fluid to the at least one cooling channel 370 of the spar 360. Specifically, the vane assembly 300 includes three inlets 375 for supplying the cooling fluid to the at least one cooling channel 370 of the spar 360. The cooling fluid for the leading edge 310 and the spar 360 may be wholly or in part supplied from the cooling cavities (not shown) of the first and second platforms 380, 390 in order to minimise the cooling fluid consumption. The locating features 385 and 395 may be located at a greater distance from the trailing edge 320 as compared to the locating features 285 and 295 of FIG. 4b.

FIG. 6 illustrates a vane assembly 400 in accordance with another embodiment of the present disclosure. The vane assembly 400 is similar to the vane assembly 200 of FIG. 4a, with each of features 401 to 474 corresponding to equivalent features 201 to 274 of the vane assembly 200. The spar 460 and the second section 450b together form the leading edge 410. However, in this embodiment, the spar 460 forms more of the suction surface 440 as compared to the spar 260 of FIG. 4a.

FIG. 7 illustrates a vane assembly 500 in accordance with another embodiment of the present disclosure. The vane assembly 500 is substantially similar to the vane assembly 200 of FIG. 4a, with each of features 501 to 574 corresponding to equivalent features 201 to 274 of the vane assembly 200. However, in this embodiment, the second section 550b and the spar 560 partly overlap each other and form the leading edge 510. Specifically, the interior surface 555b of the second section 550b and the spar 560 overlap each other at the leading edge 510. Moreover, the spar 560 includes a different arrangement of the cooling features for allowing the cooling fluid to flow therethrough. Specifically, the shape of cooling channel 570 of the spar 560 is different with an outflow near the leading edge 510 causing a different flow of the cooling fluid.

FIG. 8 illustrates a vane assembly 600 in accordance with another embodiment of the present disclosure. The vane assembly 600 is similar to the vane assembly 200 of FIG. 4a, with each of features 601 to 674 corresponding to equivalent features 201 to 274 of the vane assembly 200. However, in this embodiment, the first section 650a and the second section 650b of the blade member 650 are integrally formed. In other words, the blade member 650 is a single part. The vane assembly 600 may be used in a second stage of the high pressure turbine 17 (shown in FIG. 1). The spar 660 may be required to deliver the cooling fluid to a disc cavity (not shown) in the second stage of the high pressure turbine 17. In this embodiment, the cooling channel 670 may route the cooling fluid through the aerofoil 601 to provide the cooling to the disc cavity or a zone below the second platform 290. The spar 660 further defines additional channels 674 instead of the rows of cooling holes 274 of the spar 260. Conventional small spars have insufficient space for the required delivery of the cooling fluid to the disc cavity. The spar 660 may provide sufficient space for the delivery of the cooling fluid to the disc cavity. The larger spar 660 may be manufactured using ALM. Further, ALM may enable further cooling improvements and/or providing design scope for weight and cost reduction of the vane assembly 600.

Figures 9A, 9B, 9C:
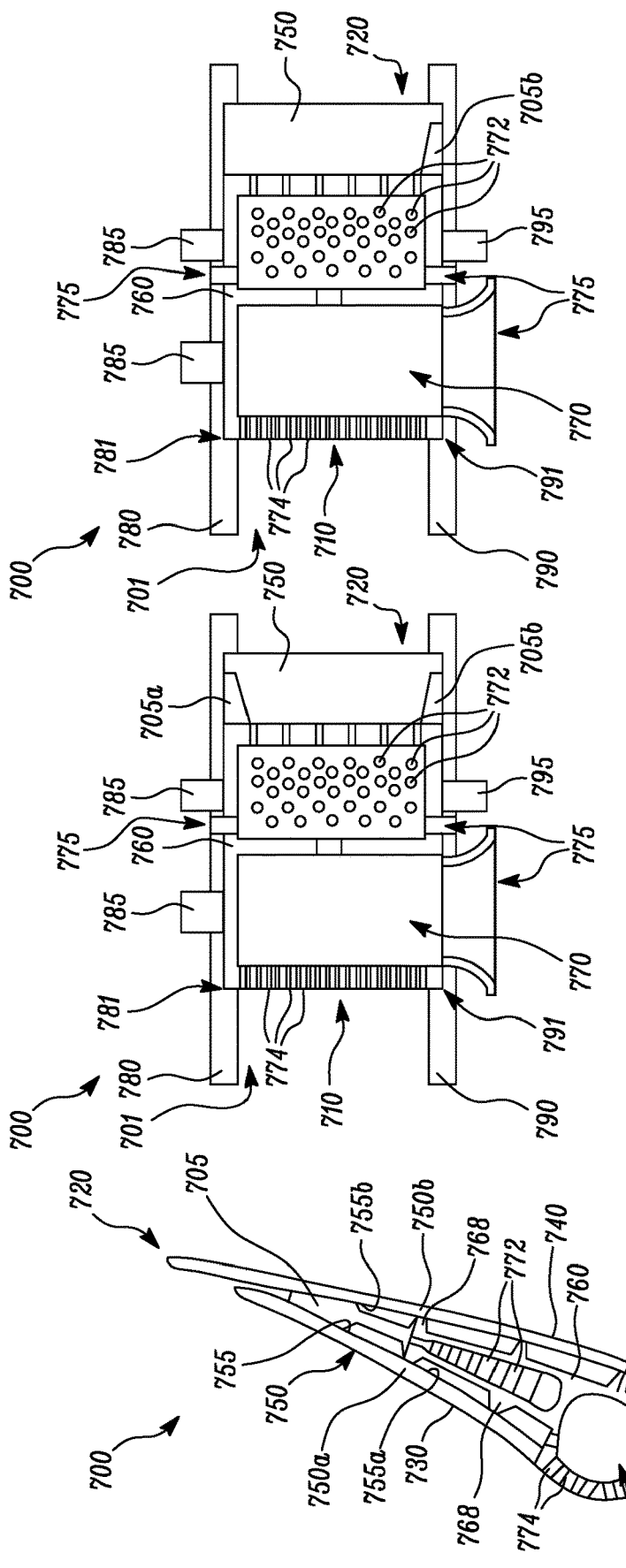
FIG. 9a is a schematic sectional view of an aerofoil of another embodiment of a vane assembly.
FIG. 9b is a schematic sectional side view of the vane assembly of FIG. 9a with two support features.
FIG. 9c is a schematic sectional side view of the vane assembly of FIG. 9a with one support feature.

FIGS. 9a-9c illustrate a vane assembly 700 in accordance with another embodiment of the present disclosure. The vane assembly 700 is similar to the vane assembly 200 of FIGS. 4a and 4b, with each of features 701 to 795 corresponding to equivalent features 201 to 295 of the vane assembly 200. In this embodiment, the spar 760 further includes a support feature 705, to locate, support and seal the first and second sections 750a, 750b of the blade member 750. The support feature 705 is disposed between the first and second sections 750a, 750b proximate the trailing edge 720 of the aerofoil 701.

FIG. 9b illustrates a sectional side view of the vane assembly 700. In this embodiment, the spar 760 includes support features 705a, 705b supporting the spar 760 on the first and second platforms 280, 290, respectively. In some other embodiments, the spar 260 may only include the support feature 705a supporting the spar 260 on the first platform 280.

FIG. 9c illustrates a sectional side view of the vane assembly 700 in accordance with another embodiment. In this embodiment, the spar 260 includes only the support feature 705b supporting the spar 260 on the second platform 290.

Figure 10B:
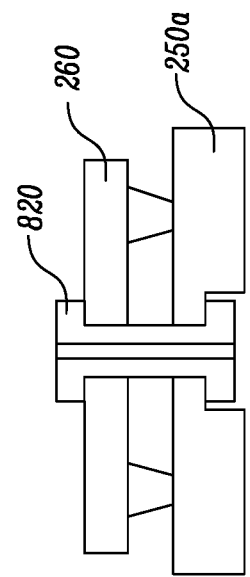
FIGS. 10a and 10b are schematic views of fasteners coupling a spar and a blade member.
Figure 10A:
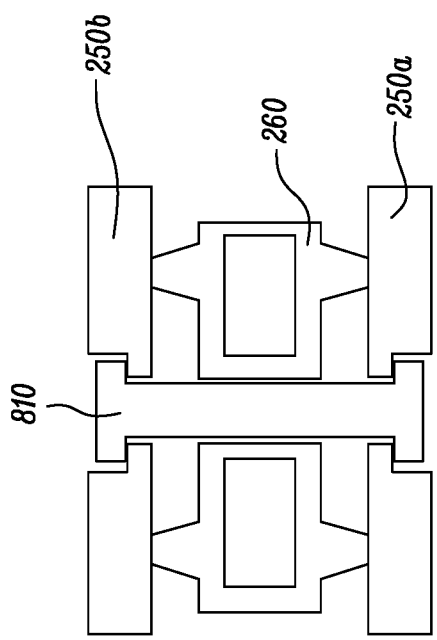

FIGS. 10a and 10b illustrate fasteners coupling the spar 260 to at least one of the first section 250a and the second section 250b of the blade member 250. FIG. 10a shows a solid rivet 810 coupling the spar 260 to the first section 250a and the second section 250b of the blade member 250. FIG. 10b illustrates a hollow rivet 820 coupling the spar 260 to the first section 250a of the blade member 250. In some other embodiments, the hollow rivet 820 may couple the spar 260 to the second section 250b of the blade member 250. The fastener may be made of metal. In some other embodiments, the fasteners can be, for example, a bolt, a nut and bolt assembly, and so forth. It should be noted that the fastener need not extend through the entire spar 260.

Figures 11A, 11B:
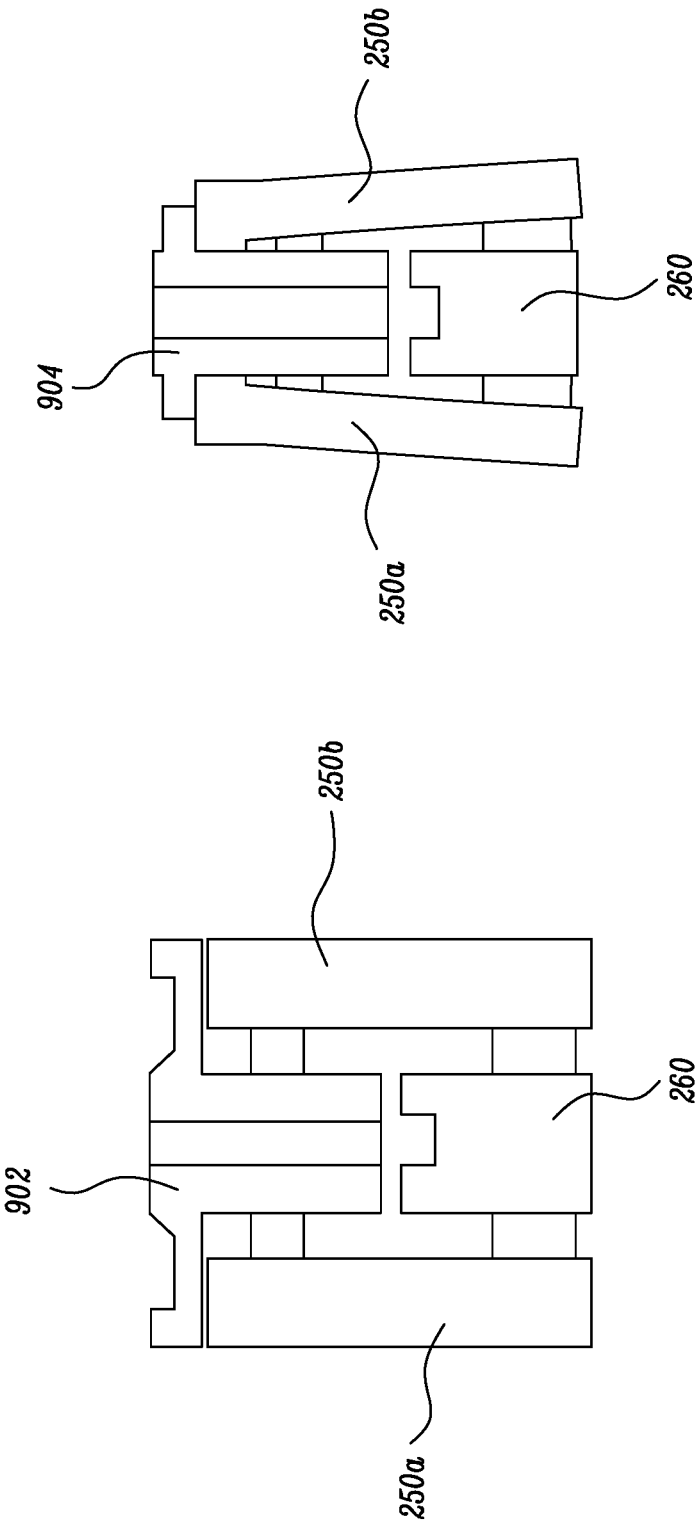
FIGS. 11a and 11b are schematic views of different couplings between a spar and a blade member.

FIGS. 11a and 11b illustrate coupling of the spar 260 to at least one of the first section 250a and the second section 250b of the blade member 250. FIG. 11a shows the spar 260 including a portion 902 of the spar 260 extending laterally over the first and second sections 250a, 250b. In the illustrated embodiment of FIG. 11a, the spar 260 may be oriented substantially parallel to the first and second sections 250a, 250b. The portion 902 may form an integral blade tip or shroud. A cooling passage 903 is shown exiting to the tip. The cooling passage 903 allows flow of the cooling fluid (e.g., cooling air). Holes 906 from the cooling passage 903 provide the cooling fluid to the first and second sections 250a, 250b. In some embodiments, some of the cooling fluid escapes at the top of the first and second sections 250a, 250b, providing additional cooling to the shroud. FIG. 11b shows the first and second sections 250a, 250b inclined obliquely relative to the spar 260. A portion 904 of the spar 260 shown in FIG. 11b may be smaller than the coupling portion 902 of FIG. 11a. As shown in FIG. 11b, the first and second sections 250a, 250b tightly fit to the spar 260. In some other embodiments, each of the portions 902, 904 is bonded to the spar 260 to locate and/or clamp the first and second sections 250a, 250b. In some embodiments, each of the portions 902, 904 is attached to the first and second sections 250a, 250b by various methods, for example, but not limited to, welding, brazing, bi-casting, and so forth.

Figure 12:
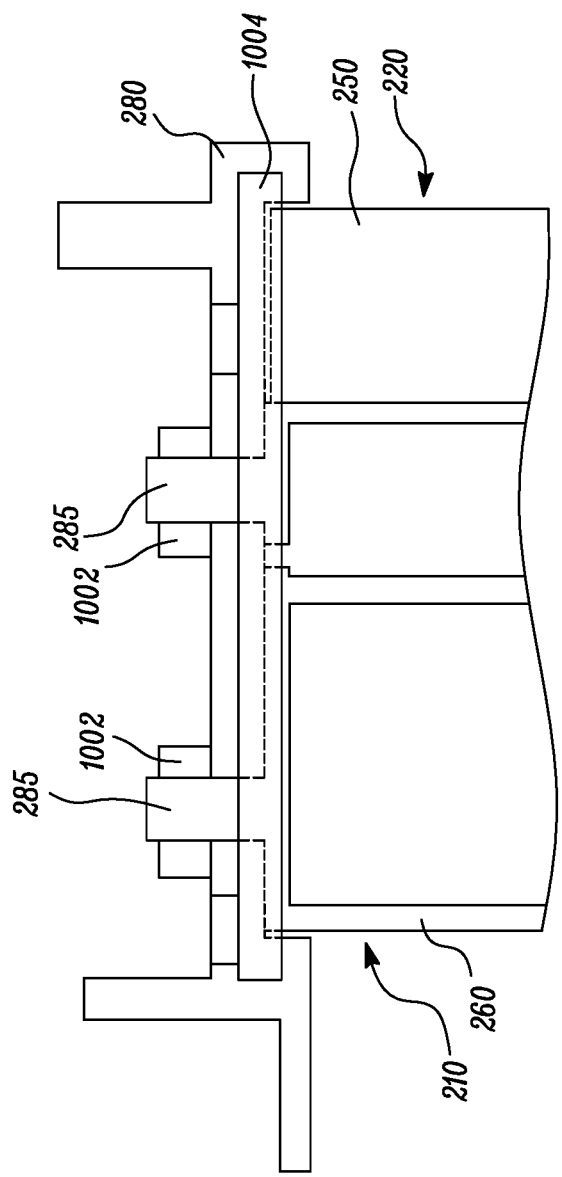
FIG. 12 is a schematic sectional view of a vane assembly with a platform clamped onto a spar.

FIG. 12 illustrates a platform cooling passage 1004. The locating features 285 are received in the first platform 280. Fastening members 1002 secure the locating features 285 to the first platform 280. The blade member 250 and the first and second sections 250a, 250b fit into the first and second platforms 280, 290 such that the blade member 250 and the first and second platforms 280, 290 open into the platform cooling passage 1004. In some embodiments, platform cooling air may be fed to the spar 260 to provide cooling to the spar 260. In some embodiments, platform cooling air may also provide a purge flow to ensure hot gas is not ingested at any gaps between the blade member 250 and the first and second platforms 280, 290.

Figure 13B:
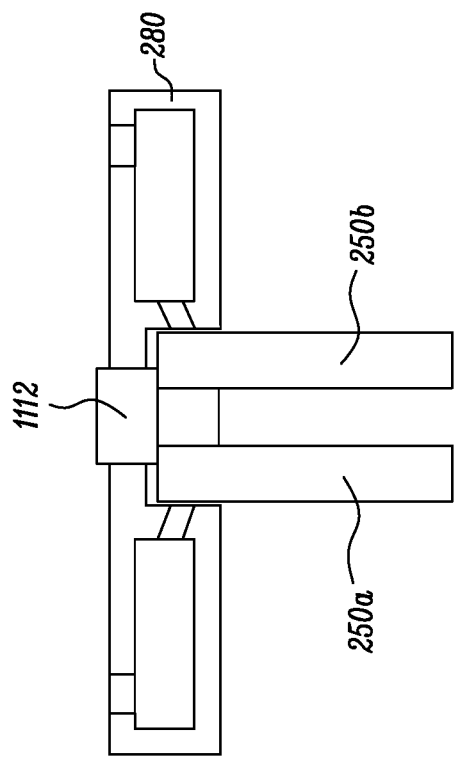
FIGS. 13a and 13b are schematic sectional views of different sealings between a blade member and a platform.
Figure 13A:
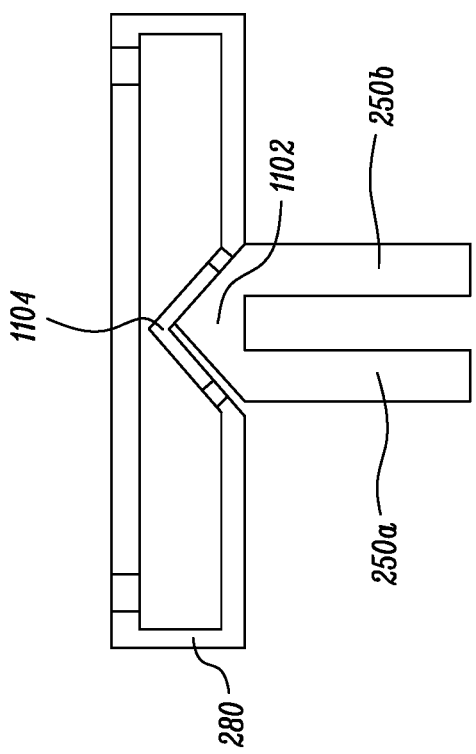

FIGS. 13a and 13b illustrate different sealing techniques for sealing gaps defined between the first section 250a and the second section 250b. During engine operation, it may be undesirable to have gaps between ends of the first section 250a and the second section 250b. Hot gases in the high pressure turbine 17 (shown in FIG. 1) may flow through the gaps due to the large pressure differentials between the pressure surface 230 and the suction surface 240 of the vane assembly 200 (shown in FIG. 4a). In some cases, the cooling fluid may also leak through the gaps. Such leakage may reduce aerodynamic performance as well as cause additional cooling issues.

FIG. 13a shows sealing of the first section 250a and the second section 250b. The first section 250a and the second section 250b are joined to each other at their ends by a triangular portion 1102. The first platform 280 includes a triangular region 1104 corresponding to the triangular portion 1102. The engagement between the triangular portion 1102 and the triangular region 1104 may allow movement and/or distortion of the first and second section 250a, 250b due to an aerodynamic load. Holes 1106 fluidly communicate the platform cooling passage 1004 with faces of the triangular portion 1102 and the triangular region 1104. The holes 1106 may open or close based upon the movement and/or distortion of the first and second section 250a, 250b ensuring a flow of the cooling fluid to any exposed surfaces. Any over-tip leakage due to hot gases travelling from the pressure surface 230 to the suction surface 240 may be diluted by the flow of the cooling fluid. The contact between the angled faces of the triangular portion 1102 and the triangular region 1104 may provide sealing against over-tip leakage.

FIG. 13b shows sealing the first section 250a and the second section 250b by filling a gap between the first and second sections 250a, 250b, and the first platform 280 by a compliant insert or seal 1112. In this embodiment, the first platform 280 includes a pocket 1108. The pocket 1108 is cooled by the cooling fluid flowing from the platform cooling passage 1004 via holes 1110. Any over-tip leakage due to hot gases travelling from the pressure surface 230 to the suction surface 240 may be diluted by the flow of the cooling fluid. The seal 1112 may additionally provide sealing against the over-tip leakage. The seal 1112 may be any suitable type of seal. In some embodiments, the seal 1112 may be a compressive seal. In some other embodiments, the seal 1112 may be tightly fit against the aerofoil 201 by various methods. The seal 1112 may include, for example, metals and ceramics. In some embodiments, the seal 1112 may be provided by an extension of a bi-cast clip.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A vane assembly comprising:
an aerofoil having a leading edge, a trailing edge, and a pressure surface
and a suction surface defined between the leading edge and the trailing edge, the aerofoil comprising:
a blade member forming the trailing edge, at least a portion of the pressure surface and at least a portion of the suction surface, wherein the blade member is formed of a first material; and
a spar at least partly enclosed by the blade member and forming at least a portion of the leading edge and at least partially exposed to a hot gas path, the spar further forming at least one cooling channel and supporting at least a portion of an interior surface of the blade member, wherein the spar is formed of a second material different from the first material;

wherein the second material has a greater impact resistance than the first material; and wherein the first material comprises a ceramic matrix composite.

2. The vane assembly of claim 1, wherein the blade member further comprises:

a first section forming at least the portion of the pressure surface; and a second section forming at least the portion of the suction surface;

wherein the first section and the second section together form the trailing edge; and wherein the spar supports at least a portion of an interior surface of the first section and at least a portion of an interior surface of the second section.

3. The vane assembly as claimed in claim 2, wherein the spar and the first section together form the leading edge.

4. The vane assembly as claimed in claim 2, wherein the spar and the first section together form the pressure surface.

5. The vane assembly as claimed in claim 2, wherein the second section forms entirely the suction surface.

6. The vane assembly as claimed in claim 2, wherein the first section and the second section are separate parts.

7. The vane assembly as claimed in claim 2, wherein the first section and the second section are integrally formed.

8. The vane assembly as claimed in claim 2, further comprising a fastener coupling the spar to at least one of the first section and the second section.

9. The vane assembly as claimed in claim 8, wherein the fastener is a solid rivet or a hollow rivet.

10. The vane assembly as claimed in claim 1, further comprising:

a first platform disposed proximate a top end of the aerofoil; and a second platform disposed proximate a bottom end of the aerofoil;

wherein the spar further comprises at least one first locating feature coupling the spar to the first platform, at least one second locating feature coupling the spar to the second platform and at least one support feature supporting the spar on the second platform.

11. The vane assembly as claimed in claim 1, wherein the second material comprises a metallic material.

12. The vane assembly as claimed in claim 1, further comprising at least one inlet for supplying cooling fluid to the at least one cooling channel of the spar.

13. The vane assembly as claimed in claim 1, wherein the blade member is joined to the spar by at least one of welding, brazing and bi-casting.

14. A gas turbine engine comprising the vane assembly as claimed in claim 1.

* * * * *